(12) United States Patent  
Swirhun et al.

(10) Patent No.: US 9,285,461 B2  
(45) Date of Patent: Mar. 15, 2016

(54) STEERABLE TRANSMIT, STEERABLE RECEIVE FREQUENCY MODULATED CONTINUOUS WAVE RADAR TRANSCEIVER

(71) Applicant: Nokia Corporation, Espoo (FI)

(72) Inventors: Paul Stanley Swirhun, El Cerrito, CA (US); Andrew Patrick Townley, Berkeley, CA (US)

(73) Assignee: Nokia Technologies Oy, Espoo (FI)

( * ) Notice: Subject to any disclaimer, the term of this patent is extended or adjusted under 35 U.S.C. 154(b) by 357 days.

(21) Appl. No.: 13/795,544

(22) Filed: Mar. 12, 2013

(65) Prior Publication Data

US 2014/0266866 A1    Sep. 18, 2014

(51) Int. Cl.
*G01S 13/00* (2006.01)
*G01S 7/02* (2006.01)
(Continued)

(52) U.S. Cl.
CPC . *G01S 7/026* (2013.01); *G01S 7/03* (2013.01); *G01S 7/35* (2013.01); *H01P 5/187* (2013.01); *G01S 13/34* (2013.01); *G01S 2013/0254* (2013.01)

(58) Field of Classification Search
CPC ......... G01S 7/026; G01S 7/032; G01S 7/034; G01S 13/34; G01S 2013/0254; H01P 5/187
USPC ................ 342/175, 188, 194, 357.75–357.77
See application file for complete search history.

(56) References Cited

U.S. PATENT DOCUMENTS 7,515,099 B2 *   4/2009   Kwon ..................... G01S 7/026
                                                    342/188
7,576,687 B2     8/2009   Forstner (Continued)

FOREIGN PATENT DOCUMENTS

EP        1 795 914       6/2007

OTHER PUBLICATIONS

Kim, C., "A Quadrature Radar Topology with Tx Leakage Canceller for 24GHz Radar Applications"—IEEE T-MTT 2007; IEEE Transactions on Microwave Theory and Techniques, Publication: Jul. 2007; Korea Adv. Inst. of Sci. & Technol., vol. 55, Issue: 7; pp. 1438-1444.

(Continued)

*Primary Examiner* — John B Sotomayor
*Assistant Examiner* — Marcus Windrich
(74) *Attorney, Agent, or Firm* — Locke Lord LLP

(57)  ABSTRACT

Apparatus, method, and system example embodiments provide an improved integrated circuit RF front end to simultaneously transmit and receive signals for radar imaging. In an example embodiment, an apparatus comprises a transceiver coupled to a circularly polarized antenna assembly, capable of transmitting circularly polarized signals that are a component of a multi-signal radar beam; a power amplifier configured to amplify a transmit signal, coupled through isolation couplers to the circularly polarized antenna assembly; a phase shifting block circuit configured to perform phase shifting of a local oscillator signal, in response to the receipt of phase control signals, to perform phased-array beam steering of the multi-signal radar beam when the component circular signals are associated with signals transmitted from other transceivers receiving the phase control signals. The apparatus further includes a receiver circuit utilizing a receive phase-shifting circuit coupled to a quadrature down-conversion mixer, for receive beam steering.

11 Claims, 12 Drawing Sheets

(51) Int. Cl.
*G01S 7/03* (2006.01)
*G01S 7/35* (2006.01)
*H01P 5/18* (2006.01)
G01S 13/34 (2006.01)
G01S 13/02 (2006.01)

(56) References Cited

U.S. PATENT DOCUMENTS

| | | | | |
|---|---|---|---|---|
| 7,656,347 B2* | 2/2010 | Hong | | G01S 7/032 342/175 |
| 7,746,267 B2* | 6/2010 | Raney | | G01S 7/026 342/188 |
| 7,855,617 B2 | 12/2010 | Cheung et al. | | |
| 2004/0125010 A1* | 7/2004 | Natsume | | G01S 13/34 342/70 |
| 2007/0013582 A1* | 1/2007 | Kwon | | G01S 7/026 342/188 |
| 2008/0080599 A1 | 4/2008 | Kang et al. | | |
| 2009/0207072 A1* | 8/2009 | Hong | | G01S 7/038 342/194 |
| 2009/0251362 A1* | 10/2009 | Margomenos | | G01S 7/032 342/175 |
| 2011/0014880 A1 | 1/2011 | Nicolson et al. | | |
| 2013/0088391 A1* | 4/2013 | Corman | | H04B 7/10 342/365 |
| 2013/0136209 A1* | 5/2013 | Saunders | | H04L 27/362 375/316 |

OTHER PUBLICATIONS

Kim, C., "A Circularly Polarized Balanced Radar Front-End with a Single Antenna for 24-GHz Radar Applications"—IEEE T-MTT 2009; Microwave Theory and Techniques, IEEE Transactions; Publication: Feb. 2009; Sch. of Electr. Eng. & Comput. Sci., Korea Adv. Inst. of Sci. & Technol., vol. 57, Issue: 2; pp. 293-297.

Kim, J., "24 GHz Circularly Polarized Doppler Radar with a Single Antenna"—2005 European Microwave Conference, Dept. EECS, Korea Advanced Institute of Science and Technology (KAIST).

* cited by examiner

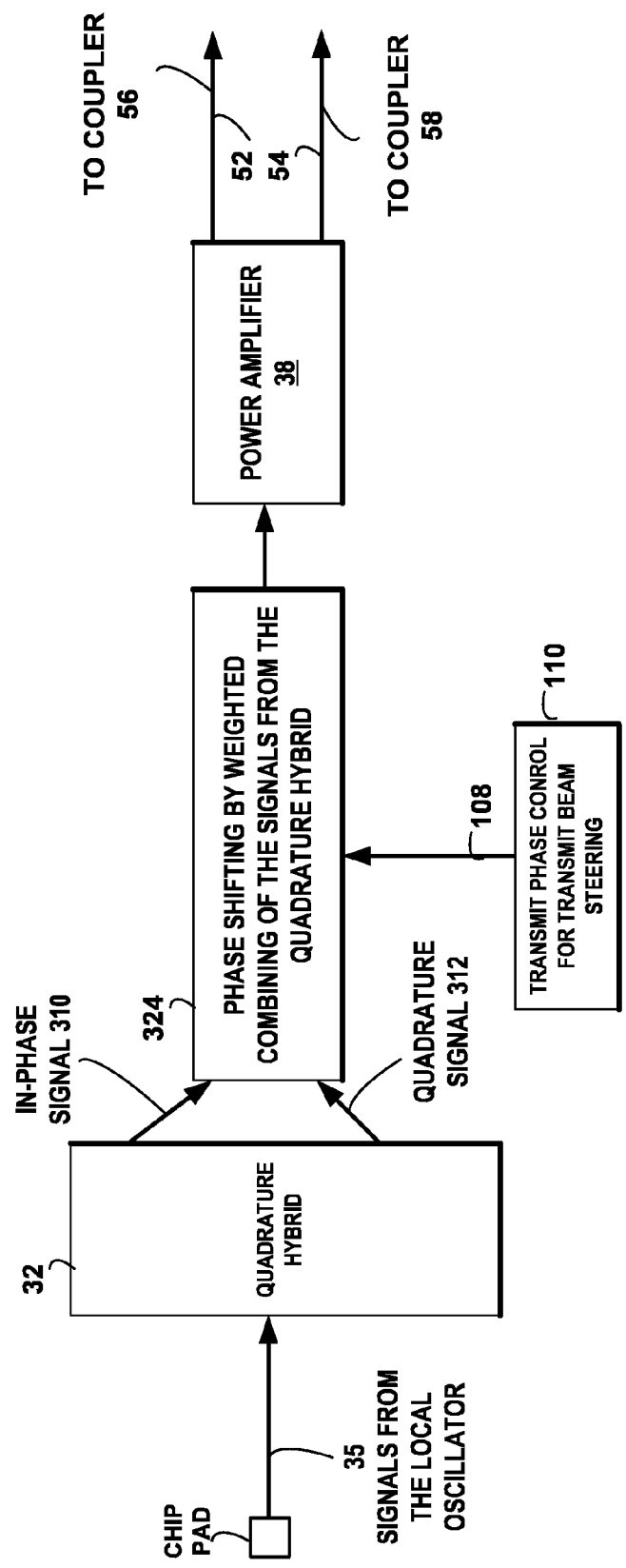

STEP 902: PHASE SHIFTING, IN A TRANSCEIVER, A TRANSMIT SIGNAL FROM A LOCAL OSCILLATOR, IN RESPONSE TO RECEIVING TRANSMIT PHASE CONTROL SIGNALS;

STEP 904: AMPLIFYING, IN THE TRANSCEIVER, THE PHASE SHIFTED TRANSMIT SIGNAL, WITH DIFFERENTIAL OUTPUT FOR TRANSMISSION OF IN-PHASE SIGNALS VIA A FIRST POLARITY TERMINAL OF A DUAL-ORTHOGONALLY POLARIZED ANTENNA ASSEMBLY AND TRANSMISSION OF QUADRATURE-PHASE SIGNALS VIA A SECOND POLARITY TERMINAL OF THE DUAL-ORTHOGONALLY POLARIZED ANTENNA ASSEMBLY, FORMING A CIRCULARLY POLARIZED ELECTROMAGNETIC WAVE THAT IS ADDITIVELY COMBINED WITH CIRCULARLY POLARIZED ELECTROMAGNETIC WAVES TRANSMITTED FROM OTHER TRANSCEIVERS; AND

STEP 906: PERFORMING, IN THE TRANSCEIVER, PHASED-ARRAY TRANSMIT BEAM STEERING OF A MULTI-ELEMENT RADAR BEAM IN RESPONSE TO TRANSMIT PHASE CONTROL SIGNALS, TO STEER THE MULTI-ELEMENT RADAR BEAM IN RESPONSE TO THE TRANSMIT PHASE CONTROL SIGNALS.

STEERABLE TRANSMIT, STEERABLE RECEIVE FREQUENCY MODULATED CONTINUOUS WAVE RADAR TRANSCEIVER

FIELD

The field of the invention relates to radio frequency, microwave, and millimeter-wave circuits used in communication, radar, and imaging systems.

BACKGROUND

Microwave and millimeter-wave integrated circuits are essential to the functionality of wireless communication, radar, and imaging systems. Radar systems are important to military, automotive, and airborne vehicles where they may provide distance and velocity information of distant objects. Microwave and millimeter-wave-imaging methods such as radar may be relevant in medical and non-medical imaging applications in the near future such as cancer diagnostics, heart-rate monitoring, and gesture recognition.

Frequency Modulated Continuous Wave (FMCW) radar is a type of radar detection where a transmitted radar sine wave is swept in frequency around a center frequency. Typically the sweep is narrow in bandwidth, compared to the center frequency. Signals received, after being reflected by distant objects, are at a frequency that is no longer equal to the frequency currently being transmitted, due to the time delay for the electromagnetic wave to travel the range distance twice. The transmitter radar signal and receive radar signal are mixed to produce a low frequency signal whose frequency indicates the range of the target. Velocity information may also be deduced, using multiple frequency sweeps in succession, which may be increasing or decreasing in frequency.

SUMMARY

Apparatus, method, and system example embodiments provide an improved integrated circuit RF front end to simultaneously transmit and receive signals for radar imaging.

An example embodiment of the invention includes an apparatus comprising:

a transceiver coupled to a dual-orthogonally polarized antenna assembly, capable of transmitting circularly polarized signals that are a component of a multi-element radar beam;

a transmit phase shifting circuit in the transceiver, configured to apply a phase shift to a transmit signal from a local oscillator, in response to receiving transmit phase control signals;

a power amplifier in the transceiver coupled to the transmit phase shifting circuit, having a differential output with a first port coupled through a first isolation coupler to a first polarity terminal of the dual-orthogonally polarized antenna assembly, for transmission of in-phase signals and with a second port of the differential output coupled through a second isolation coupler and a 90-degree phase delay to a second polarity terminal of the dual-orthogonally polarized antenna assembly, for transmission of quadrature-phase signals, the in-phase and quadrature-phase signals at the antenna assembly terminals forming a circularly polarized electromagnetic wave that is additively combined with circularly polarized electromagnetic waves transmitted from other transceivers, to perform phased-array beam steering of the multi-element radar beam in response to the transmit phase control signals.

An example embodiment of the invention includes an apparatus comprising:

a power combining circuit in the transceiver, with a first input terminal coupled through the first isolation coupler to the first polarity terminal of the dual-orthogonally polarized antenna assembly and with a second input terminal coupled through the second isolation coupler to the second polarity terminal of the dual-orthogonally polarized antenna assembly, and an output terminal;

a low noise amplifier in the transceiver, with an input terminal coupled to the output terminal of the power combining circuit, and an output terminal, configured to amplify a received circularly-polarized signal;

a first mixer having a first input coupled to the first isolation coupler and a second input coupled to the output of the low noise amplifier, configured to output a difference signal at an output thereof, related to a difference in frequency of transmitted and received radar signals, with the difference signal generated using a signal in-phase with the local oscillator signal;

a second mixer having a first input coupled to the second isolation coupler and a second input coupled to the output of the low noise amplifier through a phase delay circuit contributing a phase lag of ninety degrees, configured to output a difference signal at an output thereof, related to a difference in frequency of transmitted and received radar signals, with the difference signal generated using a signal in quadrature with the local oscillator signal; and a receive phase-shifting circuit having an in-phase input coupled to the first mixer to receive the in-phase difference signal and having a quadrature phase input coupled to the second mixer to receive the quadrature phase difference signal, and having a receive phase control input, configured to perform phased-array beam steering in response to receiving receive phase control signals, to steer a received multi-signal radar beam composed of signals reflected by an object, which were earlier transmitted from the other transceivers.

An example embodiment of the invention includes an apparatus comprising:

wherein the transceiver is formed on at least one integrated circuit chip.

An example embodiment of the invention includes an apparatus comprising:

wherein the transmit phase shifting circuit includes two variable-gain amplifiers and a power combining structure to amplify in-phase and quadrature transmit signals in weighted combinations to rotate the phase of the transmitted signal in response to the transmit phase control signals.

An example embodiment of the invention includes an apparatus comprising:

wherein the receive phase shifting circuit includes two variable-gain amplifiers and an analog summing amplifier, configured to coherently combine received signals in a phased array by weighted combinations of in-phase and quadrature phase down-converted received signals in response to the receive phase control signals.

An example embodiment of the invention includes an apparatus comprising:

the transmit phase shifting circuit further comprising:

a first variable-gain amplifier configured to amplify in-phase transmit signals in response to a first weighted value of the transmit phase control signals;

a second variable-gain amplifier configured to amplify quadrature phase of the transmit signals in response a second weighted value of the transmit phase control signals; and a signal combining circuit coupled to outputs of the first and second variable gain amplifiers, configured to combine the amplified in-phase transmit signals with the amplified quadrature phase of the transmit signals, to rotate the phase of the transmitted signal in response to the transmit phase control signals.

An example embodiment of the invention includes an apparatus comprising:

the receive phase shifting circuit further comprising:

a first variable-gain amplifier configured to amplify in-phase receive signals in response to a first weighted value of the receive phase control signals;

a second variable-gain amplifier configured to amplify quadrature phase of the receive signals in response a second weighted value of the receive phase control signals; and a signal combining circuit coupled to outputs of the first and second variable gain amplifiers, configured to combine the amplified in-phase receive signals with the amplified quadrature phase of the receive signals, to rotate the phase of the received signal in response to the receive phase control signals.

An example embodiment of the invention includes an apparatus comprising:

wherein the local oscillator is configured to sweep the frequency of the transmit signal about a center frequency and wherein the first and second mixers are configured to mix a received radar signal at an earlier transmitted sweep frequency, with a currently transmitted radar signal at a current transmitted sweep frequency and provide a beat note frequency of the mixed signals as a measure of a propagation distance to an object that reflected the received radar signal.

An example embodiment of the invention includes an apparatus comprising:

wherein the first isolation coupler and the second isolation coupler are at least one of broadside couplers or Lange couplers.

An example embodiment of the invention includes a method comprising:

phase shifting, in a transceiver, a transmit signal from a local oscillator, in response to receiving transmit phase control signals;

amplifying, in the transceiver, the phase shifted transmit signal, with differential output for transmission of in-phase signals via a first polarity terminal of a dual-orthogonally polarized antenna assembly and transmission of quadrature-phase signals via a second polarity terminal of the dual-orthogonally polarized antenna assembly, forming a circularly polarized electromagnetic wave that is additively combined with circularly polarized electromagnetic waves transmitted from other transceivers; and performing, in the transceiver, phased-array transmit beam steering of a multi-element radar beam in response to transmit phase control signals, to steer the multi-element radar beam in response to the transmit phase control signals.

An example embodiment of the invention includes a method comprising:

generating a first difference signal related to a difference in frequency of transmitted and received radar signals, using a signal in-phase with the local oscillator signal;

generating a second difference signal related to a difference in frequency of transmitted and received radar signals, with the difference signal generated using a signal in quadrature with the local oscillator signal; and phase shifting by combining the first difference signal and the second phase difference signal in response to receiving receive phase control signals to perform phased-array receive beam steering, to steer received radar signals reflected by an object, which were earlier transmitted from the other transceivers.

An example embodiment of the invention includes a method comprising:

the phase shifting the transmit signal further comprising:

amplifying in-phase transmit signals in response to a first weighted value of the transmit phase control signals;

amplifying quadrature phase of the transmit signals in response a second weighted value of the transmit phase control signals; and combining the amplified in-phase transmit signals with the amplified quadrature phase of the transmit signals, to rotate the phase of the transmitted signal in response to the transmit phase control signals.

An example embodiment of the invention includes a method comprising:

the phase shifting to perform receive beam steering further comprising:

amplifying in-phase receive signals in response to a first weighted value of the receive phase control signals;

amplifying quadrature phase of the receive signals in response a second weighted value of the receive phase control signals; and combining the amplified in-phase receive signals with the amplified quadrature phase of the receive signals, to rotate the phase of the received signal in response to the receive phase control signals.

An example embodiment of the invention includes a system comprising:

a first transceiver coupled to a first dual-orthogonally polarized antenna assembly, capable of transmitting and receiving circularly polarized first signals that are a first component of a multi-element radar beam;

a second transceiver coupled to a second dual-orthogonally polarized antenna assembly, capable of transmitting and receiving circularly polarized second signals that are a second component of the multi-element radar beam;

a beam steering controller coupled to the first and second transceivers, configured to output a first transmit phase control signal to the first transceiver and output a second transmit phase control signal to the second transceiver;

a local oscillator coupled to the first and second transceivers, configured as a signal source to the first and second transceivers;

the first transceiver comprising a first transmit phase shifting circuit, configured to apply a phase shift to a transmit signal from the local oscillator, in response to receiving the first transmit phase control signals;

a first power amplifier in the first transceiver, coupled to the first transmit phase shifting circuit, having a differential output with a first port coupled through a first isolation coupler to a first polarity terminal of the first dual-orthogonally polarized antenna assembly, for transmission of in-phase signals and with a second port of the differential output coupled through a second isolation coupler and a 90-degree phase delay to a second polarity terminal of the first dual-orthogonally polarized antenna assembly, for transmission of quadrature-phase signals, the in-phase and quadrature-phase signals at the antenna assembly terminals forming a circularly polarized electromagnetic wave that is additively combined with circularly polarized electromagnetic waves transmitted from other transceivers, to perform phased-array beam steering of the multi-element radar beam in response to the first transmit phase control signals;

the second transceiver comprising a second phase shifting circuit, configured to apply a phase shift to a transmit signal from the local oscillator, in response to receiving the second transmit phase control signals;

a second power amplifier in the second transceiver, coupled to the second transmit phase shifting circuit, having a differential output with a first port coupled through a first isolation coupler to a first polarity terminal of the second dual-orthogonally polarized antenna assembly, for transmission of in-phase signals and with a second port of the differential output coupled through a second isolation coupler and a 90-degree phase delay to a second polarity terminal of the second dual-orthogonally polarized antenna assembly, for transmission of quadrature-phase signals, the in-phase and quadrature-phase signals at the second antenna assembly terminals forming a circularly polarized electromagnetic wave that is additively combined with circularly polarized electromagnetic waves transmitted from other transceivers, to perform phased-array beam steering of the multi-element radar beam in response to the second transmit phase control signals.

An example embodiment of the invention includes a system comprising:

the first transmit phase shifting circuit further comprising:

a first variable-gain amplifier configured to amplify in-phase transmit signals in response to a first weighted value of the first transmit phase control signals;

a second variable-gain amplifier configured to amplify quadrature phase of the transmit signals in response a second weighted value of the first transmit phase control signals; and a signal combining circuit coupled to outputs of the first and second variable gain amplifiers, configured to combine the amplified in-phase transmit signals with the amplified quadrature phase of the transmit signals, to rotate the phase of the transmitted signal in response to the first transmit phase control signals.

An example embodiment of the invention includes a system comprising:

a power combining circuit in the first transceiver, with a first input terminal coupled through the first isolation coupler to the first polarity terminal of the first dual-orthogonally polarized antenna assembly and with a second input terminal coupled through the second isolation coupler to the second polarity terminal of the first dual-orthogonally polarized antenna assembly, and an output terminal;

a low noise amplifier in the first transceiver, with an input terminal coupled to the output terminal of the power combining circuit, and an output terminal, configured to amplify a received circularly-polarized signal;

a first mixer in the first transceiver, having a first input coupled to the first isolation coupler and a second input coupled to the output of the low noise amplifier, configured to output a difference signal at an output thereof, related to a difference in frequency of transmitted and received radar signals, with the difference signal generated using a signal in-phase with the local oscillator signal;

a second mixer in the first transceiver, having a first input coupled to the second isolation coupler and a second input coupled to the output of the low noise amplifier, configured to output a difference signal at an output thereof, related to a difference in frequency of transmitted and received radar signals, with the difference signal generated using a signal in quadrature with the local oscillator signal; and a receive phase-shifting circuit in the first transceiver, having an in-phase input coupled to the first mixer to receive the in-phase difference signal and having a quadrature phase input coupled to the second mixer to receive the quadrature phase difference signal, and having a receive phase control input, configured to perform phased-array beam steering in response to receiving receive phase control signals, to steer a received multi-signal radar beam composed of signals reflected by an object, which were earlier transmitted from the other transceivers.

An example embodiment of the invention includes a system comprising:

the receive phase shifting circuit further comprising:

a first variable-gain amplifier configured to amplify in-phase receive signals in response to a first weighted value of the receive phase control signals;

a second variable-gain amplifier configured to amplify quadrature phase of the receive signals in response a second weighted value of the receive phase control signals; and a signal combining circuit coupled to outputs of the first and second variable gain amplifiers, configured to combine the amplified in-phase receive signals with the amplified quadrature phase of the receive signals, to rotate the phase of the received signal in response to the receive phase control signals.

An example embodiment of the invention includes a system comprising:

wherein the first transceiver is formed on at least one first integrated circuit chip and the second transceiver formed on at least one second integrated circuit chip.

An example embodiment of the invention includes a system comprising:

wherein the first and the second transceivers are formed together on one or more integrated circuit chips.

An example embodiment of the invention includes a system comprising:

wherein the local oscillator is configured to sweep the frequency of the transmit signal about a center frequency and wherein mixers in the first and second transceivers, are configured to mix a received radar signal at an earlier transmitted sweep frequency, with a currently transmitted radar signal at a current transmitted sweep frequency and provide a beat note frequency of the mixed signals as a measure of a propagation distance to an object that reflected the received radar signal.

DESCRIPTION OF THE FIGURES

FIG. 3A is an illustration of an example embodiment of the invention, depicting the transmit phase shifter in the unit cell radar transceiver of FIG. 2, to enable phased-array transmit beam steering of the radar signal, in accordance with an example embodiment of the invention.

FIG. 9 is an example flow diagram of the process performed by radar transceiver, in accordance with example embodiments of the invention.

DISCUSSION OF EXAMPLE EMBODIMENTS OF THE INVENTION

In an example embodiment of the invention, a millimeter-Wave (W-band) Frequency Modulated Continuous Wave (FMCW) radar transceiver may be formed as an integrated circuit on at least one semiconductor chip. Both transmit and receive circuits of the transceiver may share transmit and receive antennas in a dual-orthogonally polarized antenna assembly. In accordance with an example embodiment of the invention, the transceiver may include cancellation of transmitted power for receive circuits, using isolating and balanced microwave/mmWave couplers. In accordance with an example embodiment of the invention, the transceiver may support for transmit signal-path beam steering and receive signal-path beam steering. In accordance with an example embodiment of the invention, the transceiver may generate a quadrature phase relationship between the two antenna transmit paths to generate circularly or elliptically polarized transmit signals with minimal phase-delay elements. In accordance with an example embodiment of the invention, the transceiver may perform additive recombination of circularly or elliptically polarized receive signals through the use of asymmetric phase delay of one of the two antennas paths.

Figure 1:
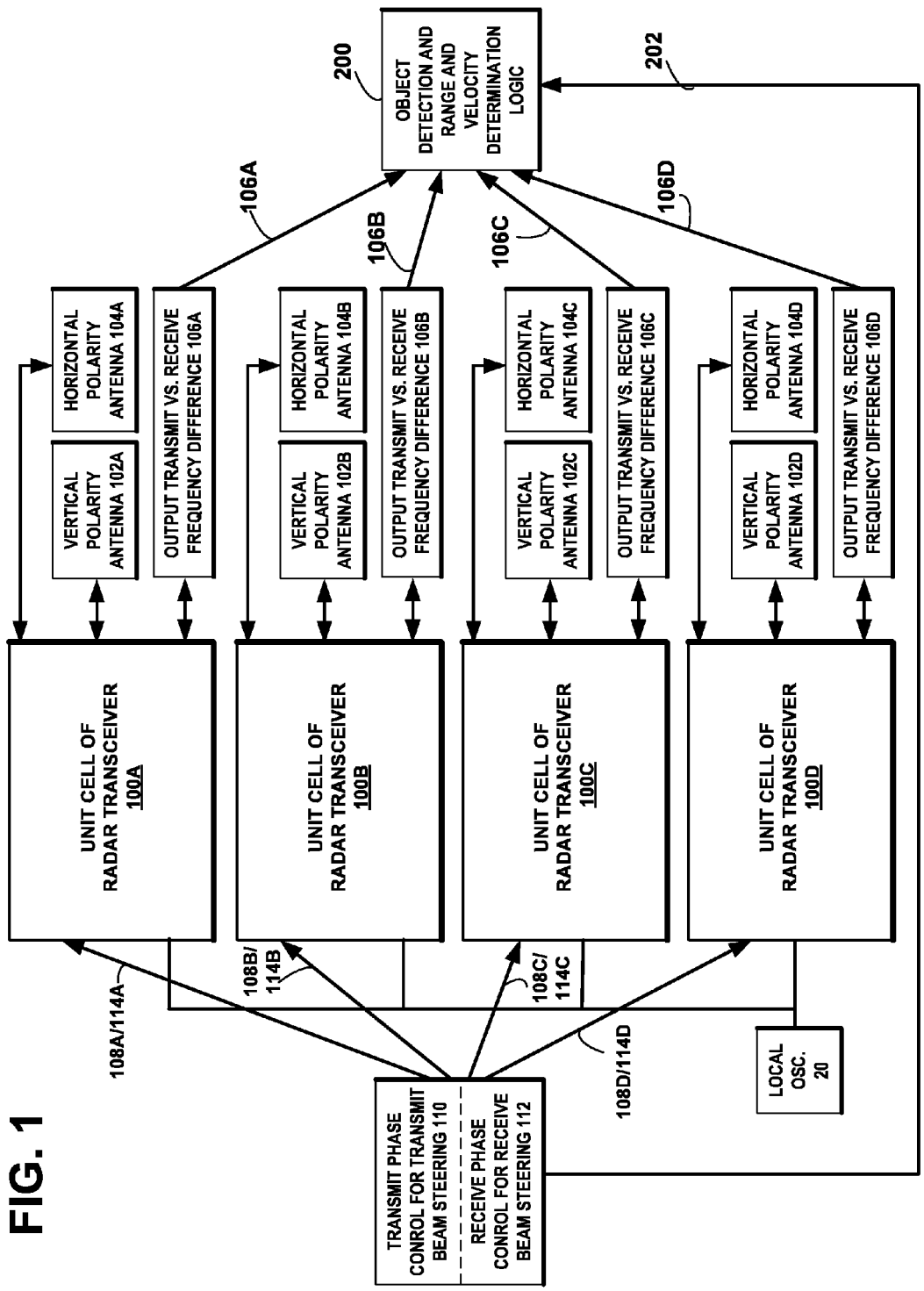
FIG. 1 is an illustration of an example embodiment of the invention, depicting four unit cell radar transceivers of FIG. 2, each connected to one or more antennas, to form a linear phased array radar system. The phased array system controls the signal phase relationship between the radar transceivers of the array, to electrically steer the transmit and/or receive antenna patterns, in accordance with an example embodiment of the invention.

FIG. 1 is an illustration of an example embodiment of the invention, depicting four radar transceivers 100A, 100B, 100C, and 100D, each of which may be connected to a respective one or more antennas 102A/104A, 102B/104B, 102C/104C, 102D/104D, to form a phased array radar system. Paired antennas, for example 102A and 104A, may be driven 90 degrees out of phase and have orthogonal linear polarizations. A single antenna may be used, instead, having two driving points that each correspond to a different polarization, for example, a square patch antenna driven on two adjacent sides. The phased array system may control the signal phase relationship between the radar transceivers 100A, 100B, 100C, and 100D of the array, to electrically steer the transmit and/or receive antenna patterns. Transmit beam steering is controlled by the transmit phase control for transmit beam steering 110, in accordance with an example embodiment of the invention. The transmit phase control signal 108 may coordinate all unit cell radar transceivers 100A, 100B, 100C, and 100D to have consecutively different phase outputs to steer the multi-element radar beam, in accordance with an example embodiment of the invention. Receive beam steering is controlled by the receive phase control for receive beam steering 112, in accordance with an example embodiment of the invention. The receive phase control signal 114 may coordinate all unit cell radar transceivers 100A, 100B, 100C, and 100D to have consecutively different phase to steer received radar signals, in accordance with an example embodiment of the invention. Each radar transceiver 100A, 100B, 100C, and 100D of the array, may output a transmit vs. receive difference value 106A, 106B, 106C, and 106D, to the object detection and range and velocity determination logic 200. The transmit phase control for transmit beam steering 110 and the receive phase control for receive beam steering 112 may output respective values for the phase control signals 108 and 114 as beam direction information to the object detection and range and velocity determination logic 200, in accordance with an example embodiment of the invention.

Figure 1A:
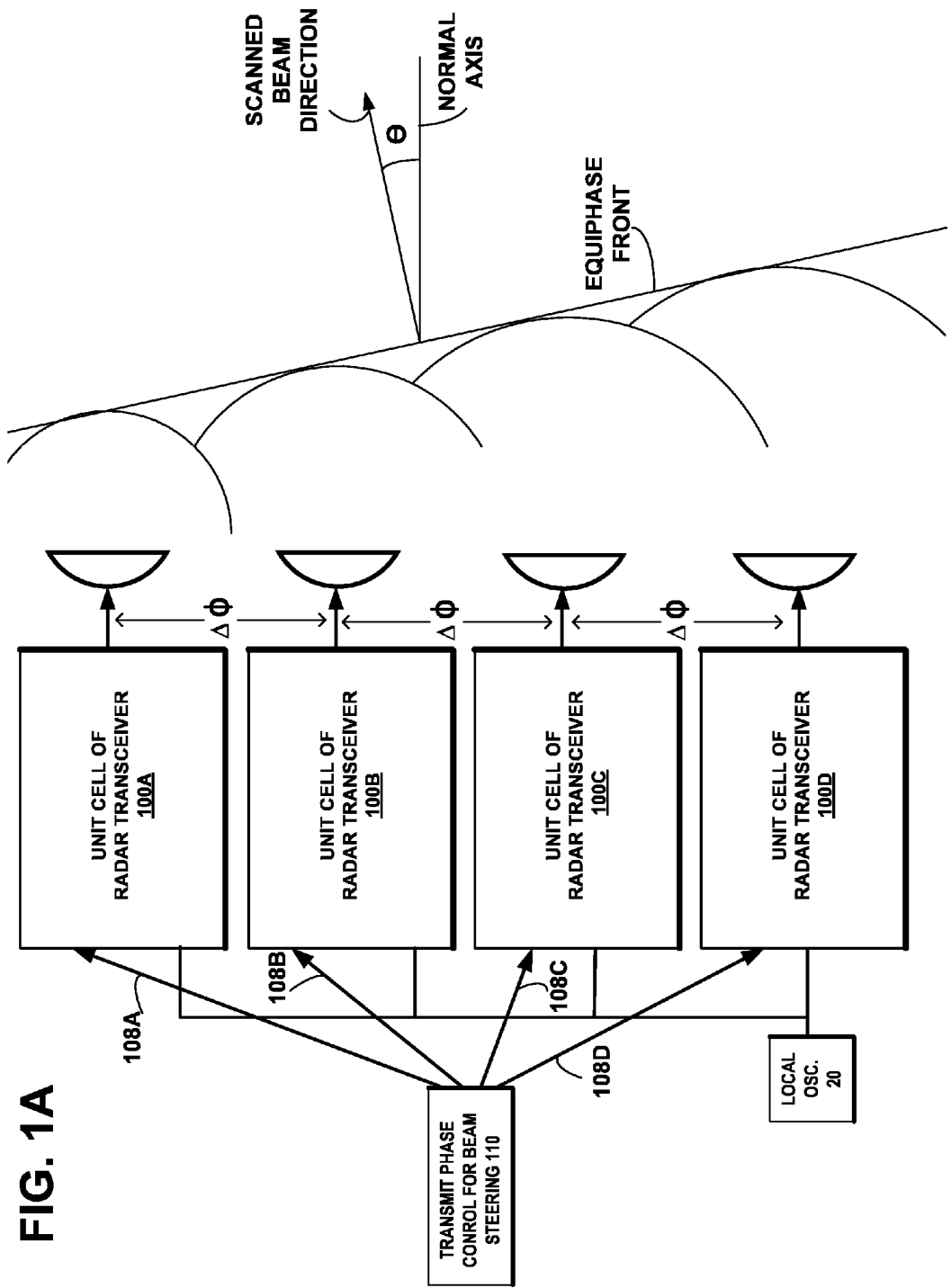
FIG. 1A is an illustration of an example embodiment of the invention, wherein each unit cell transceiver in the linear phased array of FIG. 1, controls its phase and amplitude to control the direction and shape of the beam radiated by the array, in accordance with an example embodiment of the invention.

FIG. 1A is an illustration of an example embodiment of the invention, wherein each unit cell transceiver 100A, 100B, 100C, and 100D in the linear phased array of FIG. 1, controls its phase and amplitude of transmission to control the direction and shape of the beam radiated by the array, in accordance with an example embodiment of the invention. The linear phased array may have its unit cells 100A, 100B, 100C, and 100D equally spaced. By controlling the phase and amplitude of transmission of each unit cell, as depicted, the direction and shape of the beam radiated by the array may be controlled. The example incremental phase, $\Delta\Phi$, of the transmissions by consecutive unit cells along the linear array, controls the beam pointing angle, $\Theta$, with respect to the normal axis of the phased array. In this manner the linear phased array may radiate a beam in various scan directions, $\Theta$.

Figure 1B:
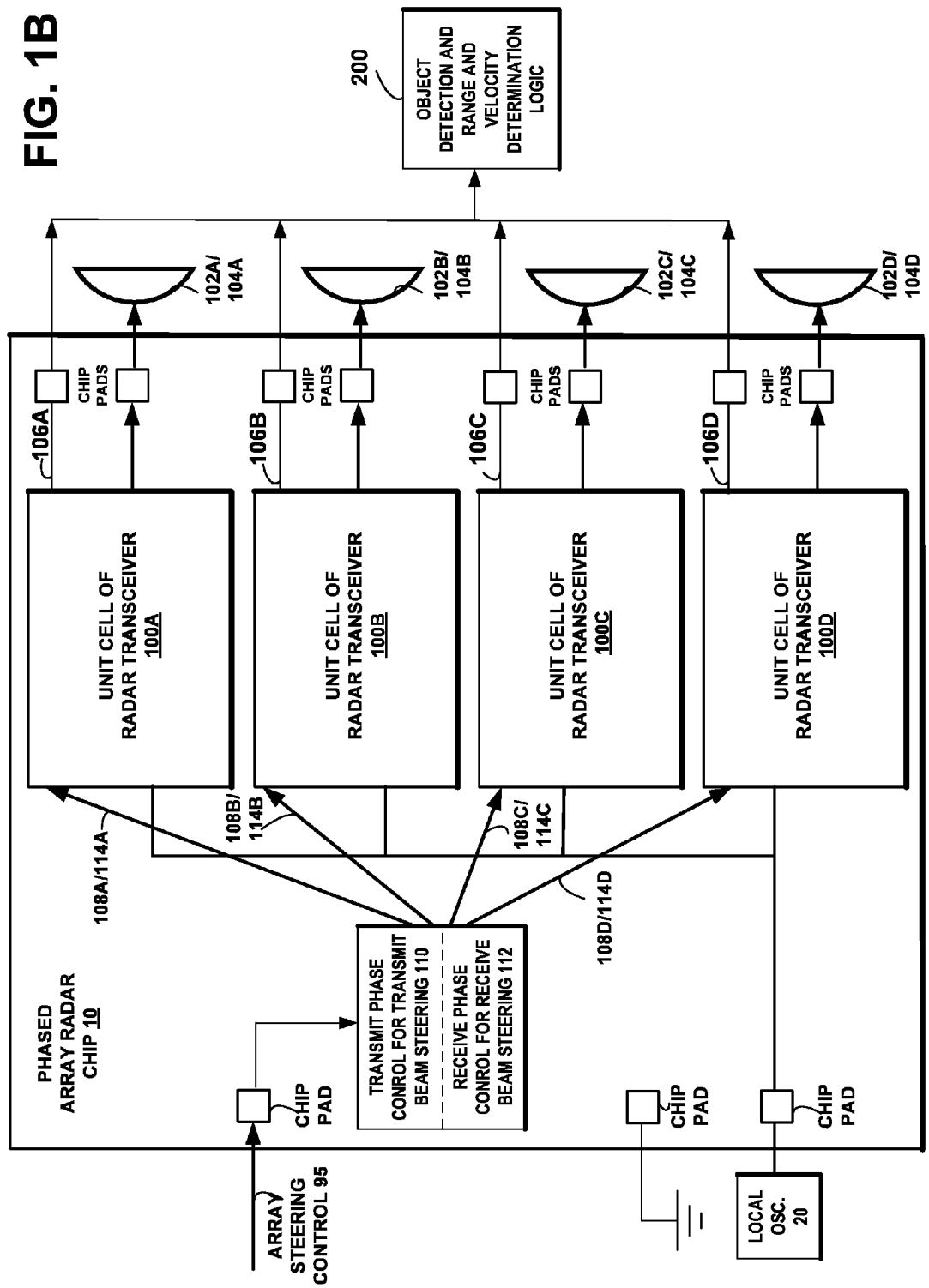
FIG. 1B is an illustration of an example embodiment of the invention, depicting four unit cell radar transceivers of FIG. 2, formed on a single semiconductor chip, as a linear phased array radar system, in accordance with an example embodiment of the invention.
Figure 2:
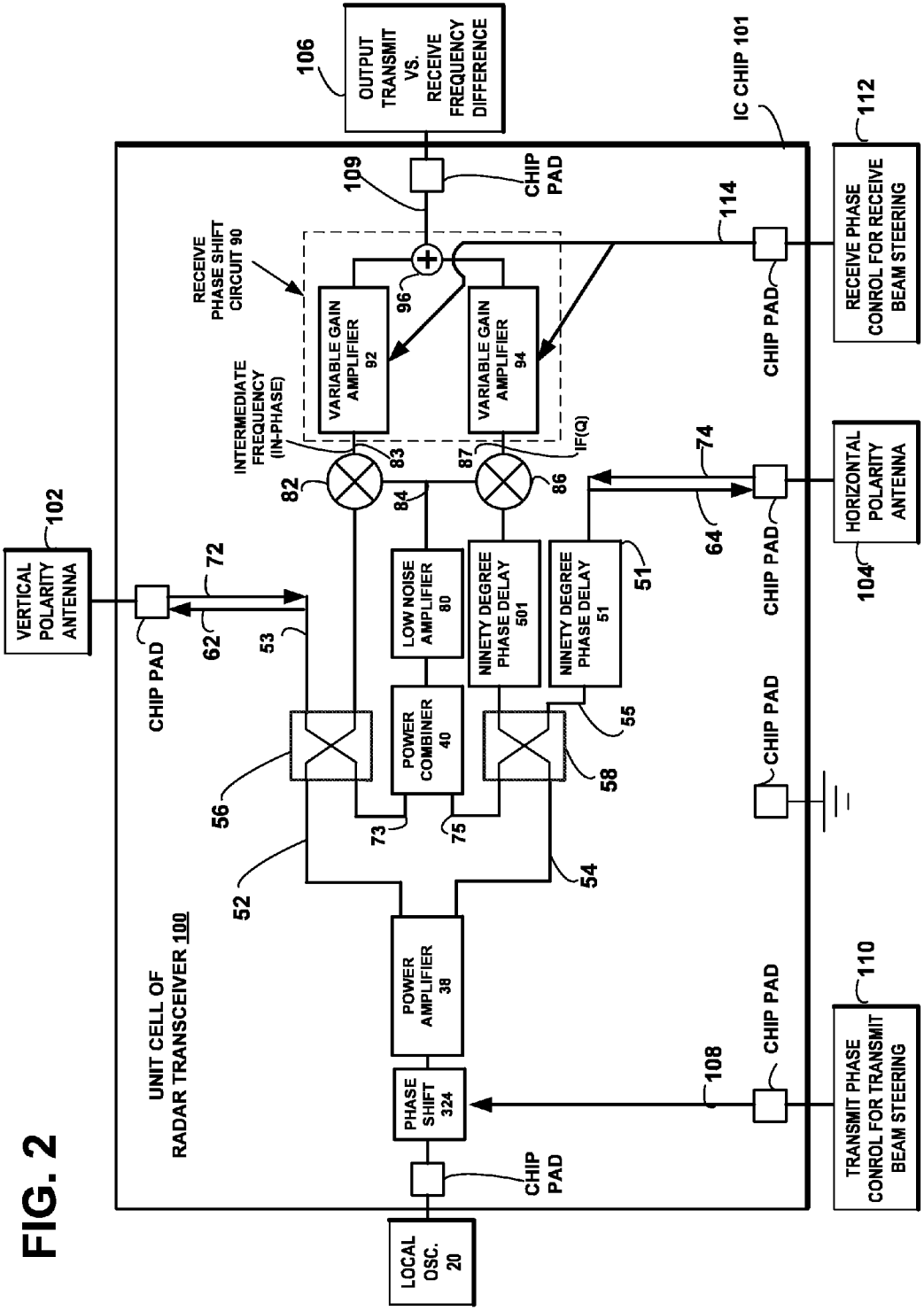
FIG. 2 is an illustration of an example embodiment of the invention, depicting one of the unit cells of the radar transceiver of FIG. 1, formed on a silicon integrated circuit chip, comprising an RF front end to simultaneously transmit and receive signals for radar imaging. The resulting outputs are to be digitized through the use of an analog-to-digital converter and subsequently digitally processed to produce range and velocity information, in accordance with an example embodiment of the invention.

FIG. 1B is an illustration of an example embodiment of the invention, depicting four unit cell radar transceivers of FIG. 2, formed on a single semiconductor chip, as a phased array radar chip 10, in accordance with an example embodiment of the invention. The four radar transceivers 100A, 100B, 100C, and 100D may be formed together on one or more integrated circuit chips 10. The array steering control 95 provides control to the transmit phase control for transmit beam steering 110 and the receive phase control for receive beam steering 112. The four radar transceivers 100A, 100B, 100C, and 100D are each coupled to a respective one or more antennas 102A/104A, 102B/104B, 102C/104C, 102D/104D, to form a phased array radar system. The phased array system may control the signal phase relationship between the radar transceivers 100A, 100B, 100C, and 100D of the array, to electrically steer the transmit and/or receive antenna patterns. Each radar transceiver 100A, 100B, 100C, and 100D of the array, may output a transmit vs. receive difference value 106A, 106B, 106C, and 106D, to the object detection and range and velocity determination logic 200, in accordance with an example embodiment of the invention.

FIG. 2 illustrates an example embodiment of the invention, wherein each of the four radar transceivers 100A, 100B, 100C, and 100D of FIG. 1 may be a replica of the unit cell radar receiver 100 of FIG. 2. The unit cell of the radar transceiver 100 may be formed on a silicon integrated circuit chip 101, as shown in FIG. 2. In accordance with an example embodiment of the invention, the circuitry of the unit cell may be partitioned into two or more integrated circuit chips. The unit cell may comprise an RF front end to simultaneously transmit and receive signals for radar imaging. The resulting outputs may be digitized through the use of an analog-to-digital converter and subsequently digitally processed to produce range and velocity information.

In accordance with an example embodiment of the invention, the radar transceiver 100 of FIG. 2 employs isolating and balanced microwave/mm-wave couplers 56 and 58 to enable transmit and receive signal-path beam steering. In accordance with an example embodiment of the invention, the radar transceiver 100 generates a quadrature phase relationship between a horizontal polarized antenna transmit path and a vertical polarized antenna transmit path to generate circularly or elliptically polarized transmit signals, with minimal phase-delay elements. In accordance with an example embodiment of the invention, the radar transceiver 100 performs additive recombination of circularly or elliptically polarized receive signals, through the use of asymmetric phase delay of the path of one of the two antennas.

Receive signal-path beam forming is achieved in the array of transceivers of FIG. 1, by the ability to phase-shift the received signal at low frequency. This may be done using in-phase/quadrature mixers 82 and 86 of FIG. 2, whose low-frequency outputs are combined through phase vector addition to form the output of each unit cell. The receive phase control signal 114 coordinates all unit cell radar transceivers 100A, 100B, 100C, and 100D to have consecutively different phases to steer the received multi-element radar beam, in accordance with an example embodiment of the invention.

In accordance with an example embodiment of the invention, the radar transceiver 100 of FIG. 2 may be viewed as organized as a transmitter block, a receiver block, and shared components formed on an integrated circuit chip, configured to simultaneously transmit and receive signals for radar imaging.

The transmitter block of the radar transceiver 100 comprises the following.

A local-oscillator 20 is configured to generate a transmit signal. That input signal may be derived from a low-frequency signal that is frequency-multiplied, or from a low frequency signal that is frequency-translated using a mixer, or from a phase locked loop whose output frequency is higher than its reference frequency, or from some combination of these three methods.

Figure 3B:
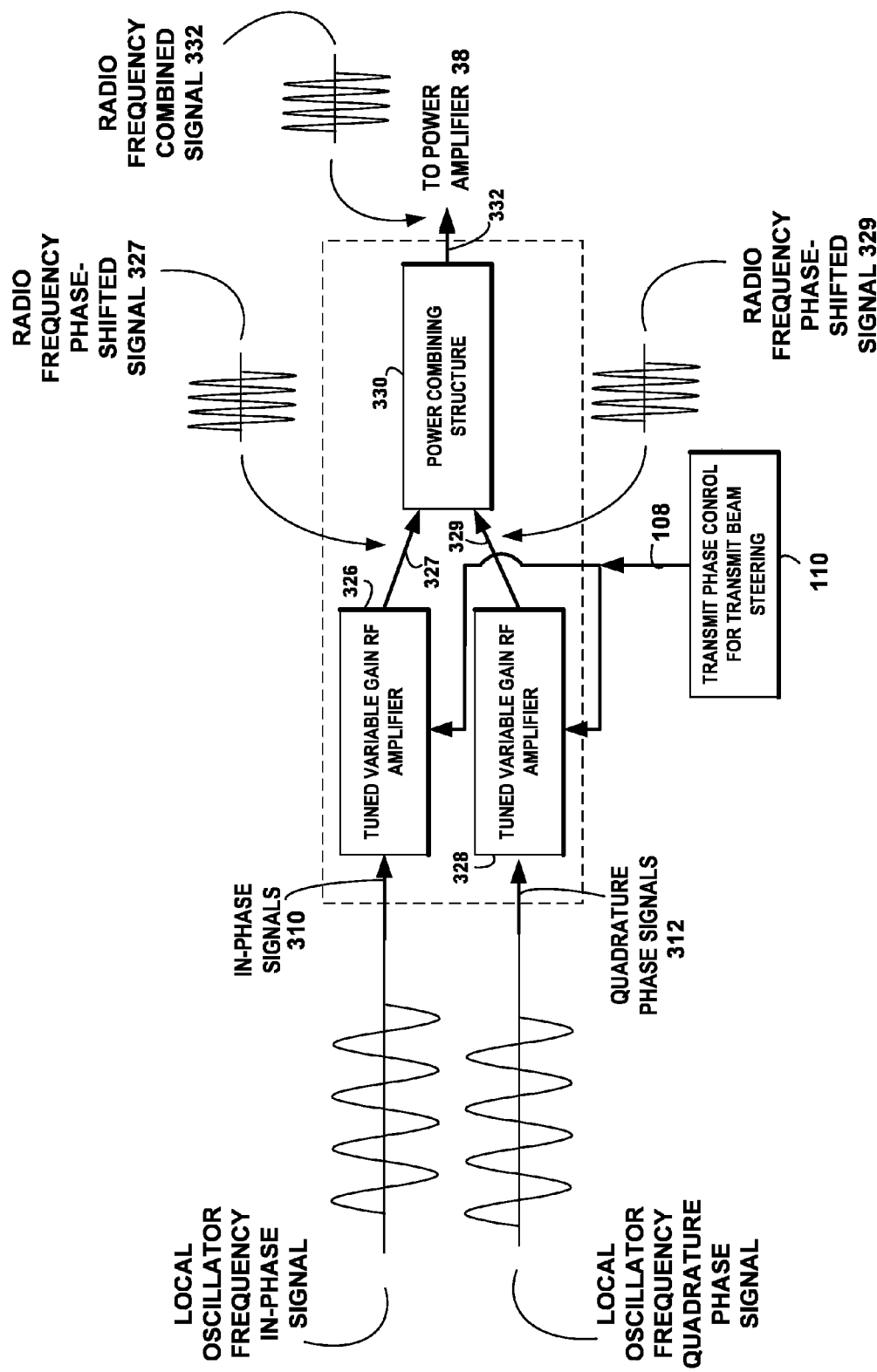
FIG. 3B is an illustration of an example embodiment of the invention, depicting a more detailed view of the transmit phase shifter of FIG. 3A in the unit cell radar transceiver of FIG. 2, in accordance with an example embodiment of the invention.

A transmit phase shifting circuit 324 in the transceiver 100, is configured to apply a phase shift to the transmit signal from the local oscillator 20, in response to receiving transmit phase control signals 108. Details of an example transmit phase shifting circuit 324 are shown in FIGS. 3A and 3B.

A power amplifier 38 in the transceiver 100, is coupled to the transmit phase shifting circuit 324. The power amplifier 38 has a differential output with a first port coupled through a first isolation coupler 56 to a first polarity terminal 53 of the dual-orthogonally polarized antenna assembly 102/104, for transmission of in-phase signals. The power amplifier 38 has a second port of the differential output coupled through a second isolation coupler 58 and a 90-degree phase delay 51 to a second polarity terminal 64 of the dual-orthogonally polarized antenna assembly 102/104, for transmission of quadrature-phase signals. The in-phase and quadrature-phase signals at the antenna assembly terminals form a circularly polarized electromagnetic wave that is additively combined with circularly polarized electromagnetic waves transmitted from other transceivers, to perform phased-array beam steering of the transmit multi-element radar beam in response to the transmit phase control signals 108.

The receiver block of the radar transceiver 100 comprises the following.

A power combining circuit 40 in the transceiver 100, has a first input terminal coupled through the first isolation coupler 56 to the first polarity terminal 53 of the dual-orthogonally polarized antenna assembly 102/104 and has a second input terminal coupled through the second isolation coupler 58 to the second polarity terminal 64 of the dual-orthogonally polarized antenna assembly 102/104, and it has an output terminal to the low noise amplifier 80. In an example embodiment of the invention, a Wilkinson power combiner 40, comprises two quarter-wave coplanar waveguide transmission lines that share a common termination at the input of the low-noise amplifier 80 and are connected through a resistive termination at their opposite end.

The low noise amplifier 80 in the transceiver 100, has an input terminal coupled to the output terminal of the power combining circuit 40, and an output terminal, configured to amplify a received circularly-polarized signal. The low-noise amplifier 80 comprises one or more stages of amplifiers, having a power splitter output 84 configured to drive the inputs of two RF mixers 82 and 86 with equal power, in-phase signals.

The first mixer 82 has a first input coupled to the first isolation coupler 56 and a second input coupled to the output of the low noise amplifier 80, configured to output a difference signal at an output thereof. The difference signal is related to a difference in frequency of transmitted and received radar signals, with the difference signal generated using a signal in-phase with the local oscillator signal.

The second mixer 86 has a first input coupled to the second isolation coupler 58 through a ninety-degree phase shift 501 and a second input coupled to the output of the low noise amplifier 80, configured to output a difference signal at an output thereof. The difference signal is related to a difference in frequency of transmitted and received radar signals, with the difference signal generated using a signal in quadrature with the local oscillator signal, generated using the ninety degree phase shift 501.

The two down-converting mixers 82 and 86 are configured to receive a local oscillator input signal, for down-converting the RF radar signals from the low-noise amplifier 80. The mixers may be unbalanced, single-balanced, or double-balanced, depending on whether their local oscillator feeds from the quadrature couplers and the RF feeds from the low noise amplifier output are single-ended or differential.

The shared components of the radar transceiver 100 comprise the following.

Figure 5:
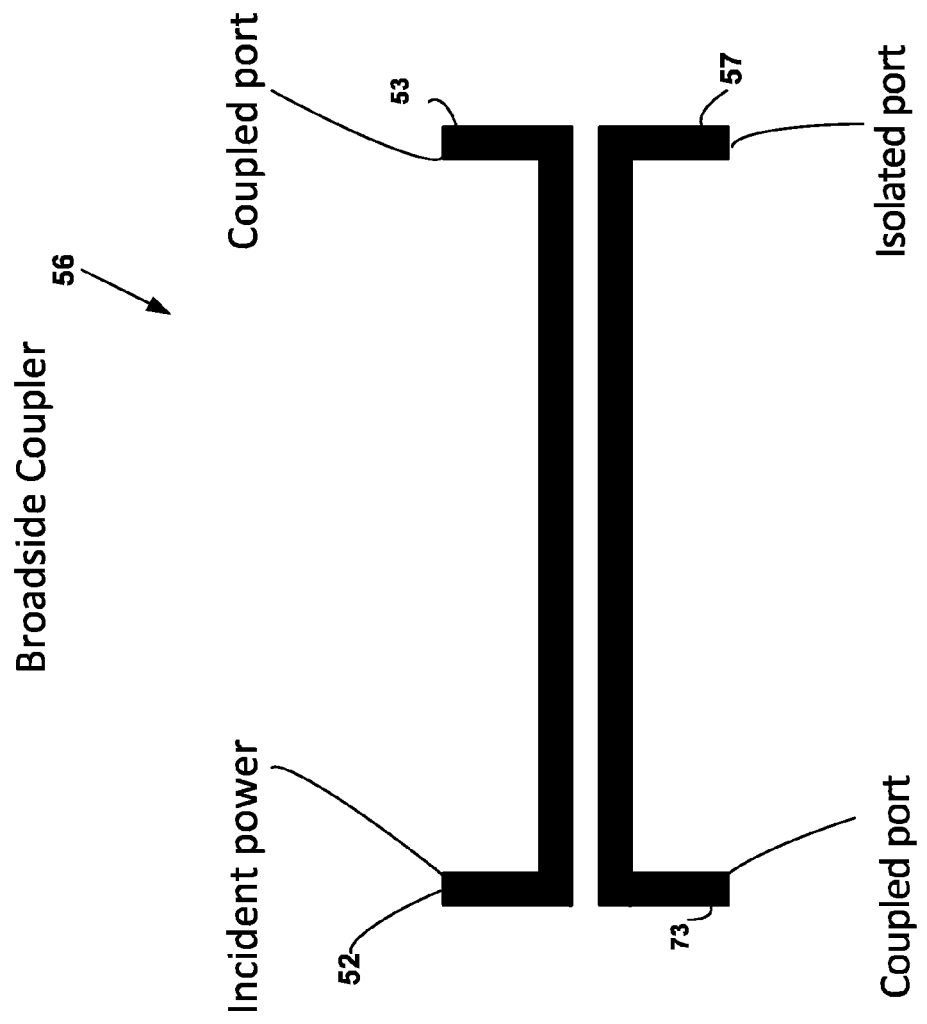
FIG. 5 illustrates an example embodiment of the invention, showing the 4-port, directional, isolating coupler as a broadside coupler that consists of two closely-spaced parallel microstrip lines, in accordance with an example embodiment of the invention.
Figure 6:
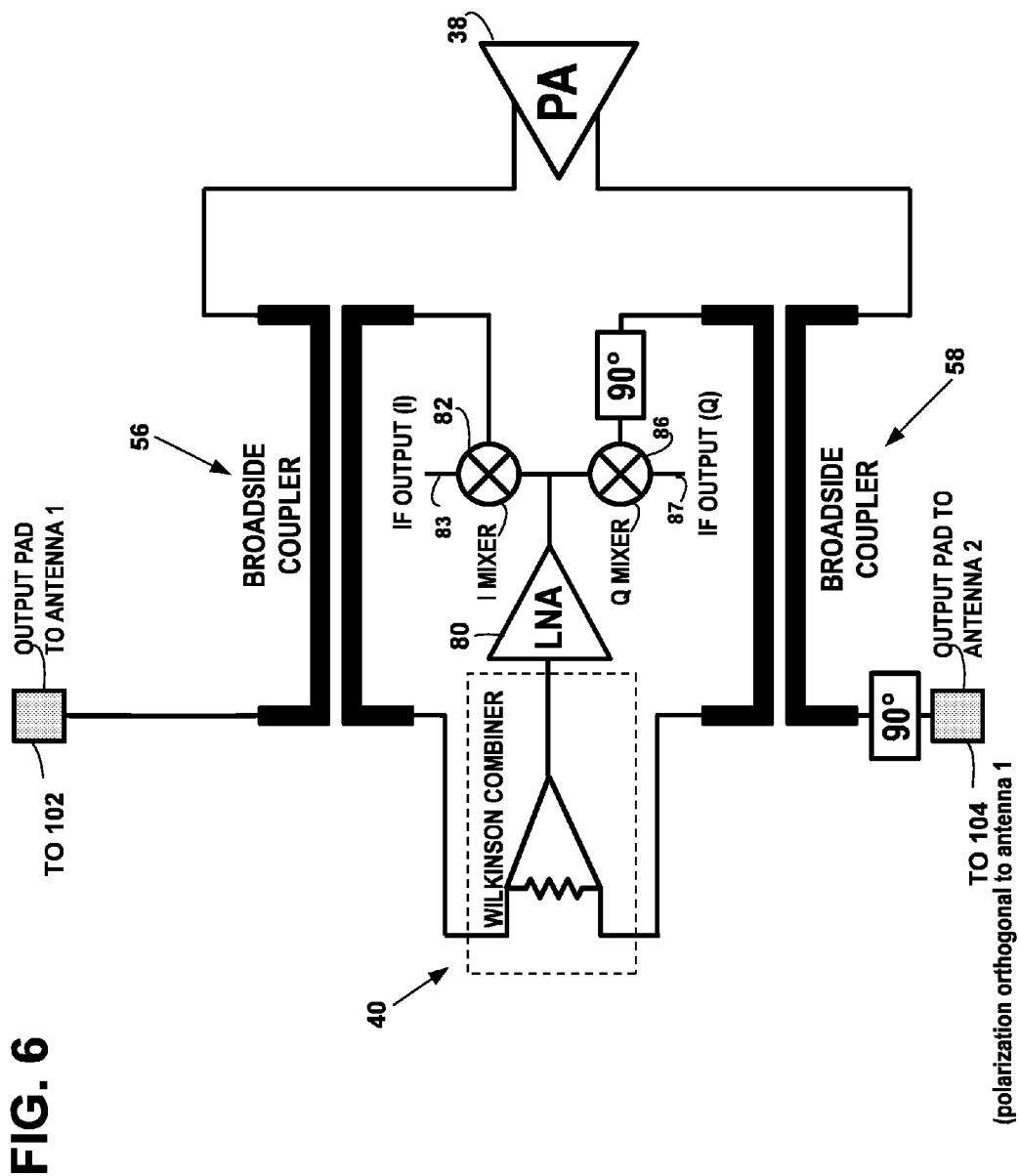
FIG. 6 illustrates an example layout topology for the radar transceiver, using the broadside coupler of FIG. 5, in accordance with an example embodiment of the invention.

Two isolating and balanced microwave/mm-wave couplers 56 and 58, referred to as broadside couplers, each comprise two coupled quarter-wavelength lines, matched to a characteristic impedance, having a respective antenna connection 53 and 55, to a resistive termination. Each coupler 56 and 58 has an isolated port of the broadside coupler on the opposite side of its input port. Each coupler 56 and 58 is configured to cancel transmitted power of the signals output by the power amplifier 38 incident on the low-noise amplifier 80. The two antenna outputs 53 and 55 feed either the two inputs of a dual-polarization antenna or two distinct orthogonally polarized antennas 102 and 104 in an antenna assembly. Details of example broadside couplers 56 and 58 are shown in FIG. 5 and their layout in the unit cell of the transceiver 100 is shown in FIG. 6.

The two down-converting mixers 82 and 86 output respective difference signals 82 and 87 related to a difference in frequency of the transmitted and received radar signals.

Figure 4:
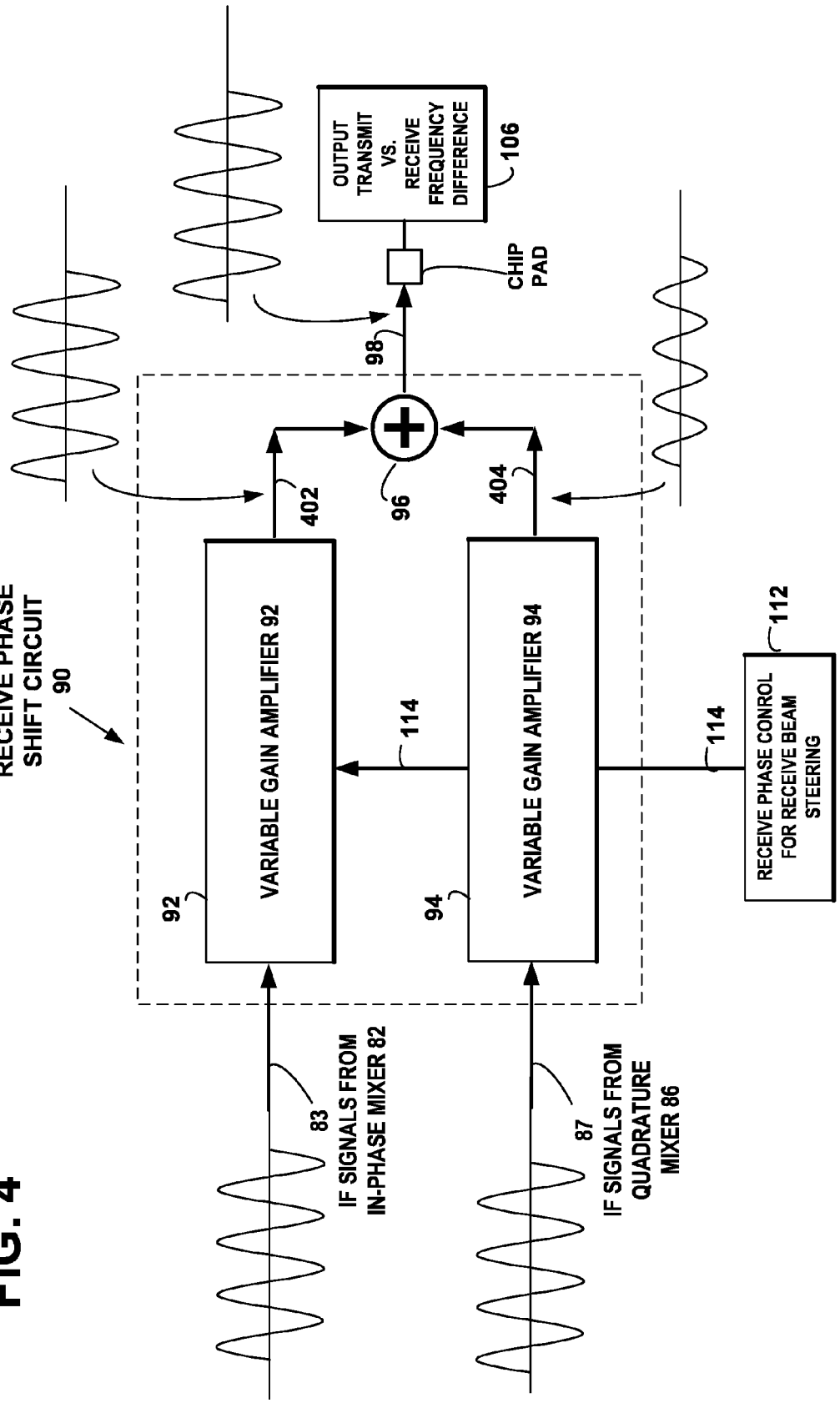
FIG. 4 is an illustration of an example embodiment of the invention, depicting the receive phase shifter in the unit cell radar transceiver of FIG. 2, to enable phased-array receive beam steering of the radar signal, in accordance with an example embodiment of the invention.

The receive phase-shifting circuit 90 has an in-phase input coupled to the first mixer 82 to receive the in-phase difference signal and has a quadrature phase input coupled to the second mixer 86 to receive the quadrature phase difference signal. The receive phase-shifting circuit 90 has a receive phase control input 114, configured to perform phased-array beam steering in response to receiving receive phase control signals 114. The phased-array beam steering is performed on a received multi-element radar beam composed of signals reflected by an object, which were earlier transmitted from the other transceivers. Details of an example receive phase shifting circuit 90 are shown in FIG. 4.

The receive phase-shifting circuit 90 performs "baseband phase-shifting." The phase shifting may be done before or after down-conversion mixers 82 and 86 to re-combine signals from many elements in an array. In fact, phase is preserved throughout a frequency-conversion, mixing operation, and phase shifting may be done in any of the three frequency domains, RF, local oscillator, or intermediate frequency. As it happens, phase shifters are more difficult to build at millimeter-wave than at a low-frequency, and thus, in accordance with an example embodiment of the invention, the receive phase shifting is done at the lower, intermediate frequency. In accordance with an example embodiment of the invention, the received signals 83 and 87 are down-converted using the two mixers 82 and 86 driven by in-phase and quadrature-phase, intermediate frequency, local oscillator signals. This may be thought of as projecting the signal vector onto two orthogonal basis vectors. The output is two intermediate frequency signals that may be recombined from multiple array elements with different signs and weightings to produce an overall intermediate frequency output from the whole array. In accordance with an example embodiment of the invention, variable-gain amplification may be used to selectively amplify each intermediate frequency signal 83 and 87, based on the receive phase control signals. The resulting amplified signals are summed in a summation circuit 96 to produce the phase shifted received signal. Both of these are fairly easy to implement since the intermediate frequency is low.

The antenna connection 53 and 55 of the two respective broadside couplers 56 and 58 are coupled one or more antennas 102 and 104, configured to transmit a circularly or elliptically polarized radar signal. The local oscillator 20 is configured to sweep the frequency of the transmitted signal about a center frequency.

The circuit reduces the transmitted signal amplitude seen at the receiver or low noise amplifier 80 by taking advantage of the differential nature of the power amplifier 38 output signal, where the outputs 52 and 54 may be 180 degrees out of phase. If the broadside coupler 56 were to have perfect isolation, then no transmit signal would be coupled to the low noise amplifier 80. However, since in practice the coupler 56 may more typically have 15-20 dB of isolation, some transmit signal may leak through to the receiver or low noise amplifier 80. Assuming that the two couplers 56 and 58 have similar leakage, they may leak transmit signals of the same amplitude, but with 180 degrees of phase difference. The Wilkinson power combiner 40 at the front of the low noise amplifier 80, may reject this differential mode signal and therefore cancel the transmit leakage.

The signal path 55 to the transmitting antenna 104, includes a 90 degree phase shift 51, shown in FIG. 2 on the horizontal polarization feed 55. In an example embodiment, the 90 degree phase shift may be on either the horizontal feed 55 or vertical feed 53. This phase shift generates a circularly polarized wave from the two antennas 102 and 104. When a circularly polarized wave is received by the antennas, the 90 degree phase shift is again seen in only one of the antenna signals. After seeing the 90 degree phase shift on the return path, the two antenna signals are now in phase and add at the input of the Wilkinson combiner 40.

In an example embodiment of the invention, the down-converting mixers 82 and 86 are configured to mix a received radar signal 72 having an earlier transmitted sweep frequency, with a currently transmitted radar signal 62 having a current transmitted sweep frequency. The output 83 of the mixer 82 provides a beat note frequency of the mixed signals, as a measure of a propagation distance to an object that reflected the received radar signal.

In an example embodiment of the invention, the receiver block of the radar transceiver 100, comprises a Wilkinson power combiner 40, the low-noise amplifier (LNA) 80, and the two down-converting mixers 82 and 86. The Wilkinson combiner 40 may consist of quarter-wavelength transmission lines (with a 70.1 Ohm characteristic impedance), which share a common termination at the input of the LNA 80 and are connected through a 50 ohm resistor at the opposite termination of the CPW lines. The LNA 80 may comprise a plurality of stage optimized for noise performance. The output of the LNA 80 includes a power splitter 84 to drive the RF inputs of the two mixers 82 and 86 with equal power, in-phase signals. Each mixer 82 and 86 may be implemented as a single-balanced, current-commutating mixer, using a transformer balun to generate a differential local oscillator signal from a single-ended local oscillator input signal.

In an example embodiment of the invention, the transmitter block is fed by a local oscillator 20 signal that may be generated by different means, for example, external frequency references, a phase-locked loop, or a frequency multiplier excited by a lower-frequency local oscillator signal. The transmitter block produces quadrature signals from the local oscillator 20 input signal, using a quadrature hybrid 32.

In an alternate example embodiment, phase shifting may be performed in the power amplifier 38 by weighted current-combining of the in-phase and quadrature local oscillator signals. The circuit implementation for phase shifting in the power amplifier 38, may use a differential cascode-style topology with two cascode transistors. Each cascode transistor shares emitter connections, but has a collector connected to the opposite polarity output. By selecting between these two cascode transistors, a full 360 degrees of phase-shifting range may be achieved. A final buffering stage may be included after the phase-shifting stage, to improve the performance of the transmitter block. An example implementation may use a pair of cascoded NPN transistors in an output stage, and use a transformer balun with a microstrip-based matching network. The transmitter block provides a balanced output signal, and the single-ended output impedance of each transmitter output port 52 and 54 is matched to the 50 Ohm characteristic impedance of the broadside couplers 56 and 58.

In an example embodiment of the invention, the interconnection between the transmitter block and receiver block, shown in FIG. 2, utilizes two broadside couplers 56 and 58, each of which consists of two coupled quarter-wavelength microstrip lines. The couplers 56 and 58 may be matched to a 50 Ohm characteristic impedance. The respective antenna connection 53 and 55 may be also matched to a 50 ohm termination.

In an example embodiment of the invention, the two mixers 82 and 86 are fed by in-phase and quadrature phase signals that are generated by an additional phase delay module 501 between the output of one of the coupler modules 58 and its associated mixer 86. In an example embodiment of the invention, variable-gain amplifiers 92 and 94 along with an analog summing circuit 96 recombine the outputs of the two mixers 82 and 86, effectively rotating the phase selectively by adjusting the relative magnitudes of the in-phase and quadrature down-converted signals.

The combination of the vertical polarity antenna 102 and the horizontal polarity antenna 104 in an antenna assembly may be capable of transmitting and receiving circularly polarized waves when excited by the system.

The Wilkinson combiner 40 is a common passive microwave structure that is used to combine two RF signals. If driven in even mode, that is, both input ports 73 and 75 having equal amplitude and in-phase, the combiner 40 will output the lossless addition of both signals on the third port to the low noise amplifier 80. If the Wilkinson combiner 40 were driven in odd mode with both inputs 73 and 75 having equal amplitude and out of phase by 180 degrees, then the combiner 40 will absorb all of the input signals and output zero power on the third port to the low noise amplifier 80.

The directional couplers 56 and 58 may be broadside couplers that each consist of two closely-spaced parallel microstrip lines, as shown in FIG. 5. The particular coupler implementation may not significantly affect the operation of the system, but a broadside coupler geometry may occupy a relatively compact area.

The function of a 4-port, directional, isolating coupler 56 and 58, as shown in FIG. 5, is to couple power incident on an input port 52 to two other ports 53 and 73 with a designed power split ratio. The couplers 56 and 58 may use an equal power split and the fourth port 57 of the coupler 56 and 58 may be isolated so that, ideally, none of the incident power on port 52 will be coupled to this port 57.

The receive phase shift circuit 90 of FIG. 2, comprising variable-gain amplifiers 92 and 94 and an analog summer 96, is used for combining the outputs of the receiver or low noise amplifier 80 in a phased array. By weighted combinations of the in-phase and quadrature down-converted signals, the received signals may be coherently combined from multiple antennas, to steer the received beam. This may be done in the analog domain using variable-gain amplifiers or in the digital domain, by having an analog-to-digital converter for each of the two components of the down-converted signal.

To coordinate angle of arrival for the transmitter beam steering, each transceiver 100A, 100B, 100C, and 100D, may be driven with the same local oscillator 20 feed. The local oscillator 20 may be distributed on-board a unit cell 101 at a lower frequency and multiplied up to the RF frequency to reduce local oscillator distribution losses. The frequency multiplication may be implemented using a phase locked loop or by a frequency multiplier circuit that uses a nonlinear amplifier to generate harmonics of the low-frequency signal.

Depending on the coupler 56 and 58 geometry, there are multiple possible layout topologies. The orientation of the isolated port 57 of the coupler 56 relative to the input port 52 may largely determine the layout geometry, since in a millimeter wave integrated circuit, it is usually not possible to have RF transmission lines that cross above or below one another. In a broadside coupler 56 and 58, the isolated port 57 is diagonally opposite of the incident power port 52. FIG. 5 depicts the orientations of the ports. Note that since the structure is symmetric and reciprocal, it may be excited from any of the four ports and the isolated port will always be diagonally across from the excited port. FIG. 6 is an example layout that shows the interconnections between the components in a layout for the radar transceiver 100, utilizing the broadside coupler 56.

FIG. 3A is an illustration of an example embodiment of the invention, depicting the transmit phase shifter 324 in the unit cell radar transceiver 100 of FIG. 2, to enable phased-array transmit beam steering of the radar signal, in accordance with an example embodiment of the invention. Signals 35 from the local oscillator 20 are applied to the quadrature hybrid 32 that outputs an in-phase transmit signal 310 and a quadrature phase transmit signal 312 to the transmit phase shifter 324. The transmit phase shifter 32 performs phase shifting by weighted combining of the signals 310 and 312 from the quadrature hybrid 32, based on the transmit phase control signal 108, in accordance with the invention.

FIG. 3B is an illustration of an example embodiment of the invention, depicting a more detailed view of the transmit phase shifter 324 of FIG. 3A in the unit cell radar transceiver 100 of FIG. 2, in accordance with an example embodiment of the invention. In an example embodiment of the invention, variable-gain, tuned RF amplifiers 326 and 328 may be used to amplify the in-phase signals 310 and quadrature signals 312 in weighted combinations to rotate the phase of the transmitted signal. The variable gain amplifiers occupy less chip area than would delay elements used for phase shifting.

The local oscillator signal 35 is converted by the quadrature hybrid 32 into an in-phase signal 310 and a quadrature phase signal 312.

The in-phase signal 310 is applied to the input of the tuned variable gain RF amplifier 326. The in-phase signal 310 may be modulated with an RF carrier signal before input to the tuned variable gain RF amplifier 326. Alternately, the in-phase signal 310 input to the tuned variable gain RF amplifier 326 modulates an RF carrier signal. The in-phase modulated RF carrier signal is then amplified in the tuned variable gain RF amplifier 326 by an amount that is in response to the transmit phase control signal 108. If it is desired to change the phase of the local oscillator signal 35 then the amplification must be different for the two tuned variable gain RF amplifiers 326 and 328. The tuned variable gain RF amplifier 326 then outputs the amplified in-phase modulated RF carrier signal 327.

The quadrature-phase signal 312 is applied to the input of the second tuned variable gain RF amplifier 328. The quadrature-phase signal 312 may be modulated with an RF carrier signal before input to the tuned variable gain RF amplifier 328. Alternately, the quadrature signal 312 input to the second tuned variable gain RF amplifier 328 modulates the same RF carrier signal as in the first amplifier 326. The quadrature modulated RF carrier signal is then amplified in the second tuned variable gain RF amplifier 328 by an amount that is in response to the transmit phase control signal 108. If it is desired to change the phase of the local oscillator signal 35 then the amplification of the quadrature modulated RF carrier signal must be different than the amplification of the in-phase modulated RF carrier signal in amplifier 326. The second tuned variable gain RF amplifier 328 then outputs the amplified quadrature modulated RF carrier signal 329.

A signal combining circuit, such as the power combining structure 330, receives the amplified in-phase modulated RF carrier signal 327 from the first tuned variable gain RF amplifier 326 and the amplified quadrature modulated RF carrier signal 329 from the second tuned variable gain RF amplifier 328. If it is desired to change the phase of the local oscillator signal 35, then the amplification of either the in-phase modulated RF carrier signal 327 or the quadrature modulated RF carrier signal 329 will have the greater amplitude. The power combining structure 330 effectively adds the two signals 327 and 329 to output a combined RF signal 332 modulated with the desired changed phase of the local oscillator signal. This signal 332 is than applied to the power amplifier 38.

A final buffering stage may be included after the phase-shifting stage 324 to improve the performance of the transmitter. An example implementation may use a pair of cascoded bipolar transistors in an output stage, and uses a transformer balun with a microstrip-based matching network.

In an example embodiment of the invention, the phase shifting the transmit signal comprises:

amplifying in-phase transmit signals in response to a first weighted value of the transmit phase control signals;

amplifying quadrature phase of the transmit signals in response a second weighted value of the transmit phase control signals; and combining the amplified in-phase transmit signals with the amplified quadrature phase of the transmit signals, to rotate the phase of the transmitted signal in response to the transmit phase control signals.

FIG. 4 is an illustration of an example embodiment of the invention, depicting the receive phase-shifting circuit 90 that performs baseband phase-shifting of the signals 83 and 87 from the mixers 82 and 86. In an example embodiment of the invention, the phase shifting may be done after down-conversion by mixers 82 and 86 to re-combine signals from many elements in an array. The variable-gain amplifiers 92 and 94 and an analog summer 96, are used for combining the outputs of the low noise amplifier 80. By weighted combinations of the in-phase and quadrature down-converted signals, the received signals may be coherently combined from multiple antennas, to steer the received beam. This may be done in the analog domain using variable-gain amplifiers or in the digital domain, by having an analog-to-digital converter for each of the two components of the down-converted signal.

The in-phase IF signal 83 is applied to the input of the variable gain amplifier 92. The in-phase signal 83 is then amplified in the variable gain amplifier 92 by an amount that is in response to the receive phase control signal 114. To change the phase of the signal 83, the amplification must be different for the two variable gain amplifiers 92 and 94.

The quadrature-phase signal 87 is applied to the input of the second variable gain amplifier 94. The quadrature signal 87 is then amplified in the second variable gain amplifier 94 by an amount that is in response to the receive phase control signal 114. To change the phase of the signal 87 then the amplification of the quadrature signal 87 must be different than the amplification of the in-phase signal 83 in amplifier 94.

A signal combining circuit, such as the adder circuit 96, receives the amplified in-phase signal 402 from the first variable gain amplifier 92 and the amplified quadrature signal 87 from the second variable gain amplifier 94. The adder circuit 96 effectively adds the two signals 402 and 404 to output a combined signal 98 with the desired changed phase. This signal 98 is then output as the transmit vs. receive frequency difference 106.

In an alternate example embodiment of the invention, the receive phase shifting circuit 90 may include a quadrature generating circuit, two variable-gain tuned amplifiers, and a power combining structure to amplify in-phase and quadrature receive signals in weighted combinations, to rotate the phase of the transmitted signal in response to the transmit phase control signals. The alternate example embodiment of the receive phase shifting circuit 90 performs receive beam steering using a quadrature generation circuit and a single mixer, which is substantially the same principle for RF phase shifting as used in the transmit phase shifting circuit of FIG. 3B. The embodiment of the alternate example embodiment of the receive phase shifting circuit 90 is schematically identical to the transmit phase shifting circuit of FIG. 3B, but the variable gain amplifiers will be designed to optimize slightly different criteria.

In an example embodiment of the invention, the phase shifting to perform receive beam steering comprises:

amplifying in-phase receive signals in response to a first weighted value of the receive phase control signals;

amplifying quadrature phase of the receive signals in response a second weighted value of the receive phase control signals; and combining the amplified in-phase receive signals with the amplified quadrature phase of the receive signals, to rotate the phase of the received signal in response to the receive phase control signals.

In accordance with an example embodiment of the invention, the integration of transmitter and receiver together may reduce system cost.

In accordance with an example embodiment of the invention, sharing of antennas between transmit and receive paths may reduce the size of the phased array required for given transmit and receive apertures.

In accordance with an example embodiment of the invention, transmit beam-steering and narrowed transmit antenna array aperture may be achieved by transmit phase control at a fine-grain level, controlling the transmit phase of every antenna.

In accordance with an example embodiment of the invention, I/Q receive demodulation may allow receive signal-path beam steering at a per-element level.

In accordance with an example embodiment of the invention, transmit and receive modularity may be increased by allocating more transceivers for a given number of antennas. The size of the array may be easily increased or decreased with no modification to the transceiver unit-cell.

In accordance with an example embodiment of the invention, the use of high frequency (for example 60 GHz and above) and silicon technology may be used to increase integration and reduce cost.

FIG. 5 illustrates an example embodiment of the invention, showing the 4-port, directional, isolating coupler as a broadside coupler 56 that consists of two closely-spaced parallel microstrip lines, in accordance with an example embodiment of the invention. The function of a 4-port, directional, isolating coupler 56 is to couple power incident on an input port 52 to two other ports 53 and 73 with a designed power split ratio. The couplers 56 and 58 may use an equal power split and the fourth port 57 of the coupler 56 and 58 may be isolated so that, ideally, none of the incident power on port 52 will be coupled to this port 57. The orientation of the isolated port 57 of the coupler 56 relative to the input port 52 may largely determine the layout geometry, since in a millimeter wave integrated circuit, it is usually not possible to have RF transmission lines that cross above or below one another. In a broadside coupler 56, the isolated port 57 is diagonally opposite of the incident power port 52.

FIG. 6 illustrates an example layout topology for the radar transceiver 100, using the broadside coupler 56 of FIG. 5, in accordance with an example embodiment of the invention. The power amplifier 38 is configured to perform phase shifting of the in-phase and quadrature phase signals to enable phased-array beam steering of the transmitted radar signal. The Wilkinson power combiner 40 comprises two quarter-wave coplanar waveguide transmission lines that share a common termination at the input of the low-noise amplifier 80. The low-noise amplifier 80 drives the inputs of two mixers 82 and 86 RF with equal power, in-phase signals. The two down-converting mixers 82 and 86 generate a differential local oscillator input signal, for down-converting received in-phase and received quadrature phase radar signals. The two broadside couplers 56 and 58, each comprising two coupled quarter-wavelength lines. Each coupler 56 and 58 is configured to cancel transmitted power of the signals output by the power amplifier 38 to the two down-converting mixers 82 and 86. The two antenna outputs feed either the two inputs of a dual-polarization antenna or two distinct orthogonally polarized antennas 102 and 104 in an antenna assembly. The two down-converting mixers 82 and 86 output respective difference signals 83 and 87 related to a difference in frequency of the transmitted and received radar signals.

Figure 7:
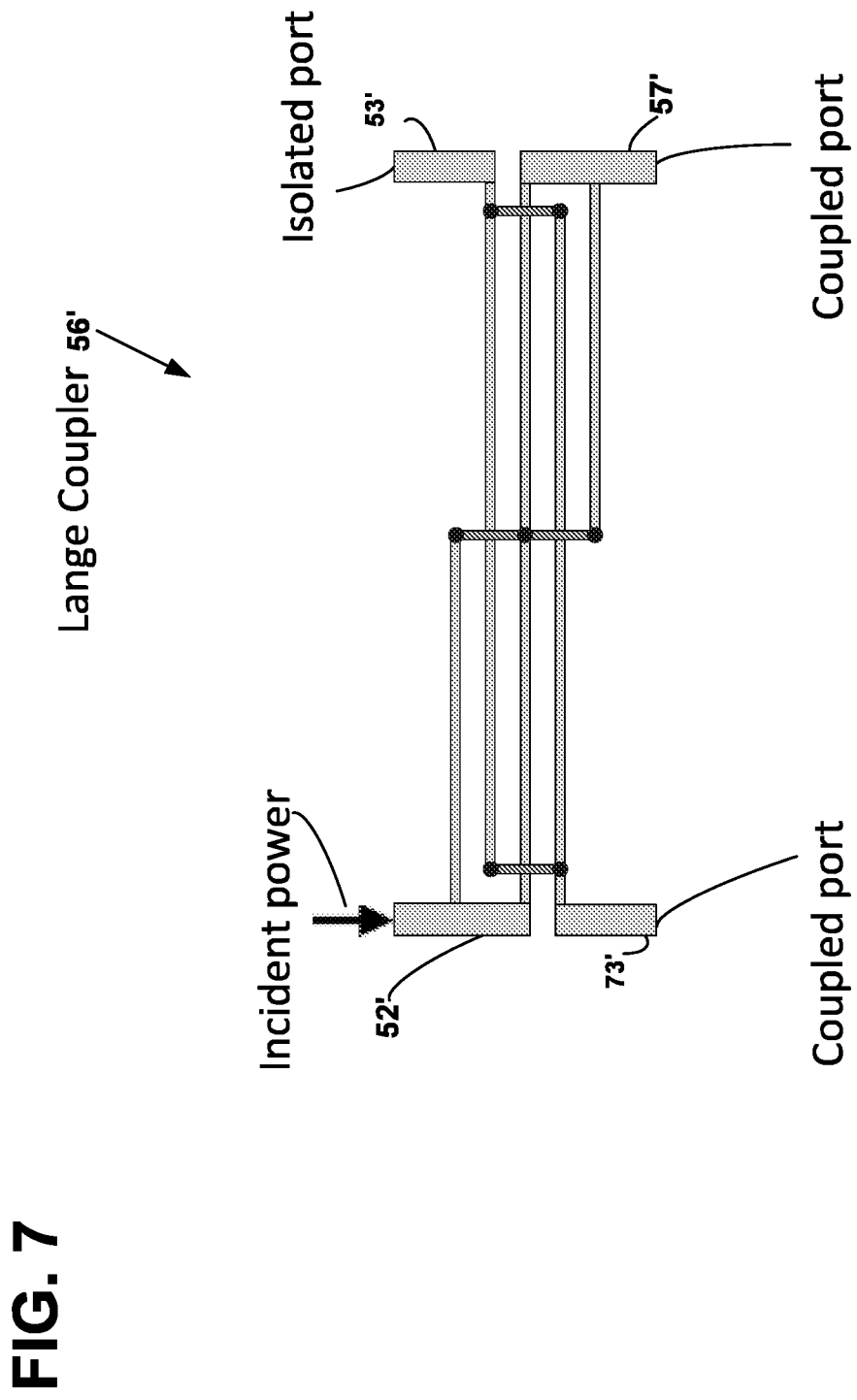
FIG. 7 illustrates an example embodiment of the invention, wherein a Lange Coupler provides the function of the 4-port, directional, isolating coupler, in accordance with an example embodiment of the invention.

FIG. 7 illustrates an example embodiment of the invention, wherein a Lange Coupler provides the function of a 4-port, directional, isolating coupler 56'. The function of a 4-port, directional, isolating coupler 56' is to couple power incident on an input port 52' to two other ports 53' and 73' with a designed power split ratio. The coupler 56' may use an equal power split and the fourth port 57' of the coupler 56' may be isolated so that, ideally, none of the incident power on port 52' will be coupled to this port 57'.

Figure 8:
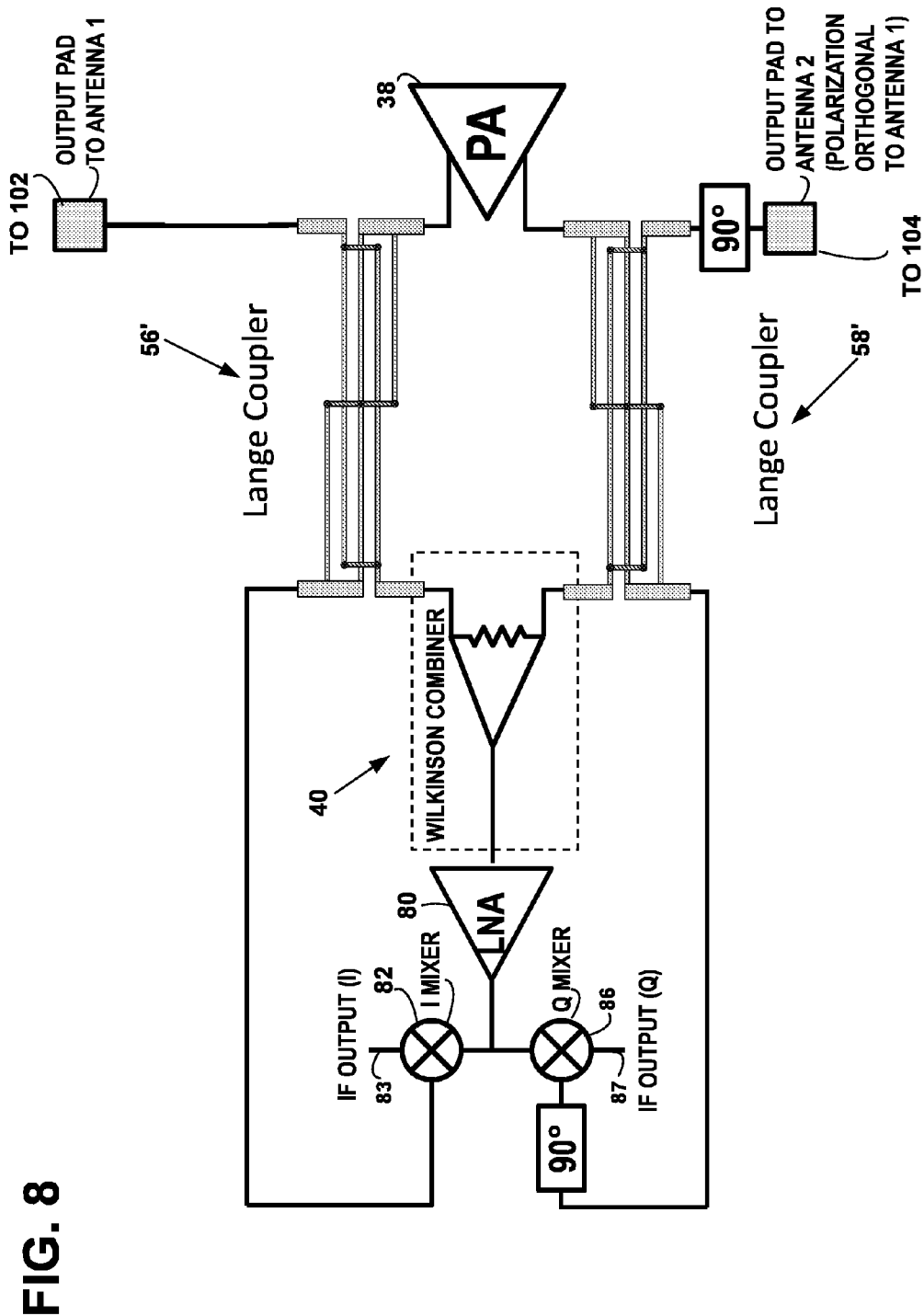
FIG. 8 illustrates an example layout topology for the radar transceiver, using the Lange Coupler of FIG. 7, in accordance with an example embodiment of the invention.

FIG. 8 illustrates an example layout topology for the radar transceiver 100, using the Lange Coupler 56' of FIG. 7. The power amplifier 38 is configured to perform phase shifting of the in-phase and quadrature phase signals to enable phased-array beam steering of the transmitted radar signal. The Wilkinson power combiner 40 comprises two quarter-wave coplanar waveguide transmission lines that share a common termination at the input of the low-noise amplifier 80. The low-noise amplifier 80 drives the inputs of two mixers 82 and 86 RF with equal power, in-phase signals. The two down-converting mixers 82 and 86 generate a differential local oscillator input signal, for down-converting received in-phase and received quadrature phase radar signals. Each Lange Coupler 56' and 58' is configured to cancel transmitted power of the signals output by the power amplifier 38 to the two down-converting mixers 82 and 86. The two antenna outputs feed either the two inputs of a dual-polarization antenna or two distinct orthogonally polarized antennas 102 and 104 in an antenna assembly. The two down-converting mixers 82 and 86 output respective difference signals 83 and 87 related to a difference in frequency of the transmitted and received radar signals.

FIG. 9 is an example flow diagram 900 of the process performed by radar transceiver 100, in accordance with example embodiments of the invention. The steps of the flow diagram may be carried out in another order than shown and individual steps may be combined or separated into component steps. Additional steps may be included in this sequence. The steps of the example method are as follows.

Step 902: phase shifting, in a transceiver, a transmit signal from a local oscillator, in response to receiving transmit phase control signals;

Step 904: amplifying, in the transceiver, the phase shifted transmit signal, with differential output for transmission of in-phase signals via a first polarity terminal of a dual-orthogonally polarized antenna assembly and transmission of quadrature-phase signals via a second polarity terminal of the dual-orthogonally polarized antenna assembly, forming a circularly polarized electromagnetic wave that is additively combined with circularly polarized electromagnetic waves transmitted from other transceivers; and Step 906: performing, in the transceiver, phased-array transmit beam steering of a multi-element radar beam in response to transmit phase control signals, to steer the multi-element radar beam in response to the transmit phase control signals.

An example embodiment of the invention includes an apparatus comprising:

means for phase shifting, in a transceiver, a transmit signal from a local oscillator, in response to receiving transmit phase control signals;

means for amplifying, in the transceiver, the phase shifted transmit signal, with differential output for transmission of in-phase signals via a first polarity terminal of a dual-orthogonally polarized antenna assembly and transmission of quadrature-phase signals via a second polarity terminal of the dual-orthogonally polarized antenna assembly, forming a circularly polarized electromagnetic wave that is additively combined with circularly polarized electromagnetic waves transmitted from other transceivers; and means for performing, in the transceiver, phased-array transmit beam steering of a multi-element radar beam in response to transmit phase control signals, to steer the multi-element radar beam in response to the transmit phase control signals.

Although specific example embodiments have been disclosed, a person skilled in the art will understand that changes can be made to the specific example embodiments without departing from the spirit and scope of the invention.

What is claimed is:

1. An apparatus, comprising:
  a transceiver coupled to a dual-orthogonally polarized antenna assembly, capable of transmitting circularly polarized signals that are a component of a multi-element radar beam;
  a transmit phase shifting circuit in the transceiver, configured to apply a phase shift to a transmit signal from a local oscillator, in response to receiving transmit phase control signals;
  a power amplifier in the transceiver coupled to the transmit phase shifting circuit, having a differential output with a first port coupled through a first isolation coupler to a first polarity terminal of the dual-orthogonally polarized antenna assembly, for transmission of in-phase signals and with a second port of the differential output coupled through a second isolation coupler and a 90-degree phase delay to a second polarity terminal of the dual-orthogonally polarized antenna assembly, for transmission of quadrature-phase signals, the in-phase and quadrature-phase signals at the antenna assembly terminals forming a circularly polarized electromagnetic wave that is additively combined with circularly polarized electromagnetic waves transmitted from other transceivers, to perform phased-array beam steering of the multi-element radar beam in response to the transmit phase control signals;
  a power combining circuit in the transceiver, with a first input terminal coupled through the first isolation coupler to the first polarity terminal of the dual-orthogonally polarized antenna assembly and with a second input terminal coupled through the second isolation coupler to the second polarity terminal of the dual-orthogonally polarized antenna assembly, and an output terminal;
  a low noise amplifier in the transceiver, with an input terminal coupled to the output terminal of the power combining circuit, and an output terminal, configured to amplify a received circularly-polarized signal;

a first mixer having a first input coupled to the first isolation coupler and a second input coupled to the output of the low noise amplifier, configured to output a difference signal at an output thereof, related to a difference in frequency of transmitted and received radar signals, with the difference signal generated using a signal in-phase with the local oscillator signal;

a second mixer having a first input coupled to the second isolation coupler through a quadrature phase-shifting circuit and a second input coupled to the output of the low noise amplifier, configured to output a difference signal at an output thereof, related to a difference in frequency of transmitted and received radar signals, with the difference signal generated using a signal in quadrature with the local oscillator signal;

a first variable-gain amplifier coupled to the first mixer, configured to amplify in-phase receive signals in response to a first weighted value of the receive phase control signals;

a second variable-gain amplifier coupled to the second mixer, configured to amplify quadrature phase of the receive signals in response a second weighted value of the receive phase control signals; and a signal combining circuit coupled to outputs of the first and second variable gain amplifiers, configured to combine the amplified in-phase receive signals with the amplified quadrature phase of the receive signals, to rotate the phase of the received signal in response to the receive phase control signals, to steer a received multi-signal radar beam composed of signals reflected by an object, which were earlier transmitted from the other transceivers.

2. The apparatus of claim 1, wherein the transceiver is formed on at least one integrated circuit chip.

3. The apparatus of claim 1, further comprising:
wherein the transmit phase shifting circuit includes two variable-gain amplifiers and a power combining structure to amplify in-phase and quadrature transmit signals in weighted combinations to rotate the phase of the transmitted signal in response to the transmit phase control signals.

4. The apparatus of claim 1, further comprising:
wherein the receive phase shifting circuit includes two variable-gain amplifiers and an analog summer, configured to coherently combine received signals in a phased array by weighted combinations of in-phase and quadrature phase down-converted received signals in response to the receive phase control signals.

5. The apparatus of claim 1, further comprising:
wherein the receive phase shifting circuit includes a quadrature generating circuit, two variable-gain tuned amplifiers, and a power combining structure to amplify in-phase and quadrature receive signals in weighted combinations to rotate the phase of the transmitted signal in response to the transmit phase control signals.

6. The apparatus of claim 1, the transmit phase shifting circuit further comprising:
a first variable-gain amplifier configured to amplify in-phase transmit signals in response to a first weighted value of the transmit phase control signals;
a second variable-gain amplifier configured to amplify quadrature phase of the transmit signals in response a second weighted value of the transmit phase control signals; and a signal combining circuit coupled to outputs of the first and second variable gain amplifiers, configured to combine the amplified in-phase transmit signals with the amplified quadrature phase of the transmit signals, to rotate the phase of the transmitted signal in response to the transmit phase control signals.

7. The apparatus of claim 1, comprising:
wherein the local oscillator is configured to sweep the frequency of the transmit signal about a center frequency and
wherein the first and second mixers are configured to mix a received radar signal at an earlier transmitted sweep frequency, with a currently transmitted radar signal at a current transmitted sweep frequency and provide a beat note frequency of the mixed signals as a measure of a propagation distance to an object that reflected the received radar signal.

8. The apparatus of claim 1, comprising:
wherein the first isolation coupler and the second isolation coupler are at least one of broadside couplers or Lange couplers.

9. A method, comprising:
phase shifting, in a transceiver, a transmit signal from a local oscillator, in response to receiving transmit phase control signals;
amplifying, in the transceiver, the phase shifted transmit signal, with differential output for transmission of in-phase signals via a first polarity terminal of a dual-orthogonally polarized antenna assembly and transmission of quadrature-phase signals via a second polarity terminal of the dual-orthogonally polarized antenna assembly, forming a circularly polarized electromagnetic wave that is additively combined with circularly polarized electromagnetic waves transmitted from other transceivers;
performing, in the transceiver, phased-array transmit beam steering of a multi-element radar beam in response to transmit phase control signals, to steer the multi-element radar beam in response to the transmit phase control signals;
generating a first difference signal related to a difference in frequency of transmitted and received radar signals, using a signal in-phase with the local oscillator signal;
generating a second difference signal related to a difference in frequency of transmitted and received radar signals, with the difference signal generated using a signal in quadrature with the local oscillator signal; and
phase shifting the first difference signal and the second phase difference signal, to perform phased-array receive beam steering in response to receiving receive phase control signals, to steer received radar signals reflected by an object, which were earlier transmitted from the other transceivers.

10. The method of claim 9, the phase shifting the transmit signal further comprising:
amplifying in-phase transmit signals in response to a first weighted value of the transmit phase control signals;
amplifying quadrature phase of the transmit signals in response a second weighted value of the transmit phase control signals; and
combining the amplified in-phase transmit signals with the amplified quadrature phase of the transmit signals, to rotate the phase of the transmitted signal in response to the transmit phase control signals.

11. The method of claim 9, the phase shifting to perform receive beam steering further comprising:

amplifying in-phase receive signals in response to a first weighted value of the receive phase control signals;

amplifying quadrature phase of the receive signals in response a second weighted value of the receive phase control signals; and combining the amplified in-phase receive signals with the amplified quadrature phase of the receive signals, to rotate the phase of the received signal in response to the receive phase control signals.

\* \* \* \* \*